United States Patent [19]
Zivkovic

[11] Patent Number: 5,439,242
[45] Date of Patent: Aug. 8, 1995

[54] SUPPORT ARRANGEMENT FOR RADIUS ARMS

[75] Inventor: Milorad Zivkovic, Filderstadt, Germany

[73] Assignee: Mercedes-Benz AG, Germany

[21] Appl. No.: 271,574

[22] Filed: Jul. 7, 1994

Related U.S. Application Data

[63] Continuation of Ser. No. 9,049, Jan. 26, 1993, abandoned.

[30] Foreign Application Priority Data

Feb. 6, 1992 [DE] Germany .......................... 42 03 366.7

[51] Int. Cl.⁶ .............................................. B62D 17/00
[52] U.S. Cl. ..................... 280/661; 280/673; 280/675
[58] Field of Search ............... 280/661, 91, 673, 675, 280/717

[56] References Cited

U.S. PATENT DOCUMENTS

| | | | |
|---|---|---|---|
| 4,616,846 | 10/1986 | Furuya et al. | 280/673 |
| 4,706,989 | 11/1987 | Iijima et al. | 280/675 |
| 4,717,175 | 1/1988 | Arai et al. | 280/673 |
| 5,062,654 | 11/1991 | Kakimoto et al. | 280/673 |

FOREIGN PATENT DOCUMENTS

| | | |
|---|---|---|
| 0430746 | 6/1991 | European Pat. Off. . |
| 1204637 | 1/1960 | France . |
| 1332032 | 4/1962 | France . |
| 1341839 | 10/1962 | France . |
| 2241722 | 3/1975 | France . |
| 2342990 | 3/1978 | Germany . |
| 8012269 | 4/1980 | Germany . |
| 3619755 | 12/1986 | Germany . |
| 3418006 | 12/1988 | Germany . |
| 4017275 | 12/1990 | Germany . |
| 3740442 | 1/1991 | Germany . |
| 2-38118 | 2/1990 | Japan . |
| 497296 | 11/1970 | Switzerland . |
| 0653917 | 5/1951 | United Kingdom . |
| 0774935 | 5/1957 | United Kingdom . |
| 0866134 | 4/1961 | United Kingdom . |
| 1566632 | 5/1980 | United Kingdom . |
| 2140123 | 11/1984 | United Kingdom . |

*Primary Examiner*—Eric D. Culbreth
*Attorney, Agent, or Firm*—Evenson, McKeown, Edwards & Lenahan

[57] ABSTRACT

A support arrangement for radius arms has an outer support arrangement part, an inner support arrangement part, an elastomer body located between the outer and inner support arrangement parts and a stop located at one end of one of the support arrangement parts to limit relative motions of the outer and inner support arrangement parts in one direction of a support arrangement center line. The stop has a centering surface concentric with the center line of the support arrangement part carrying the stop and facing towards the support arrangement part arranged to be brought into contact therewith. The centering surface, in a predetermined position of the support arrangement parts, is at a distance from the end of the adjacent support arrangement part.

9 Claims, 5 Drawing Sheets

SUPPORT ARRANGEMENT FOR RADIUS ARMS

This application is a continuation of application Ser. No. 08/009,049, filed on Jan. 26, 1993 now abandoned.

BACKGROUND AND SUMMARY OF THE INVENTION

The present invention relates to a support arrangement for radius arms, and, more particularly, to a support arrangement comprising an outer support arrangement part, an inner support arrangement part, an elastomer body located between the outer and inner support arrangement parts and having a stop located at one end of one of the support arrangement parts to limit relative motions of the outer and inner support arrangement parts in one direction of a support arrangement center line, which stop has a centering surface concentric with the center line of the support arrangement part carrying the stop and facing towards the support arrangement part arranged to be brought into contact therewith, which centering surface, in a predetermined position of the support arrangement parts, is at a distance from the end of the adjacent support arrangement part.

Support arrangements are shown in DE 40 17 275 A1 and DE 34 18 006 C2. An elastomer body provides these support arrangements with stiffness such that, when the vehicle is being driven, there is effective damping of wheel longitudinal vibrations and shocks acting on the vehicle wheel in the longitudinal direction of the vehicle. The stop associated with one end of the inner support arrangement part is used to limit the axial displacement in the direction of travel of the inner and outer support arrangement parts relative to one another in the case of extremely severe impacts directed onto the vehicle wheel in the longitudinal direction of the vehicle. If the side forces to which such support arrangements are matched are exceeded, such support arrangements permit an unallowable elastokinematic change to the axle half affected.

In addition to the configuration shown in the patent publications already mentioned, which configurations form the starting point for the present invention, support arrangements with a stop having a centering surface are also known from DE-AS 23 42 990 and JP 2-38118 (A). In these arrangements, however, the stop and one of the support arrangement parts support themselves on one another continuously so that, under the action of extreme longitudinal and transverse forces, no mutual displacement of the two support arrangement parts such as to provide a positive correction to their radial displacement will occur. Also, FIGS. 12 and 13 of DE 36 19 755 A1 finally show further technological background of the present invention.

It is an object of the present invention to provide an elastic support arrangement of a configuration of the type mentioned at the outset which, even under the effects of extreme force at right angles to the support arrangement center line, permits only such elastokinematic changes to the axle half as are still desirable or defined and which, in the case of corresponding, mutually superimposed longitudinal and lateral forces, operates so as to correct the mutual displacement, resulting from these forces, of the two support arrangement parts relative to one another.

The foregoing object has been achieved in accordance with the present invention by providing the centering surface of the stop has an annular groove narrowing conically inwardly and accommodating an end of the support arrangement part to be centered, and a groove bottom of the annular groove forms a centering bed.

Equipping the stop with an annular groove formed in the centering surface and forming a centering bed offers the advantage that a relative radial displacement between the two support arrangement parts can then only take place to a defined extent under the action of lateral or radial forces.

If, in addition to forces acting at right angles to the support arrangement center line, axially directed forces are also transmitted to the support arrangement, the end of one support arrangement part, which is being displaced in the direction towards the stop, is caused to be displaced during this axial displacement by the outer peripheral surface of the inwardly conically narrowing annular groove in the stop so as to align the two support arrangement parts coaxially relative to one another in a direction opposed to the effective force directed transversely to the support arrangement center line.

Given a sufficiently large axial force, complete compensation will then be provided by the centering bed of the annular groove for any initial radial displacement of the two support arrangement parts relative to one another (i.e., track stabilization).

BRIEF DESCRIPTION OF THE DRAWINGS

These and other objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
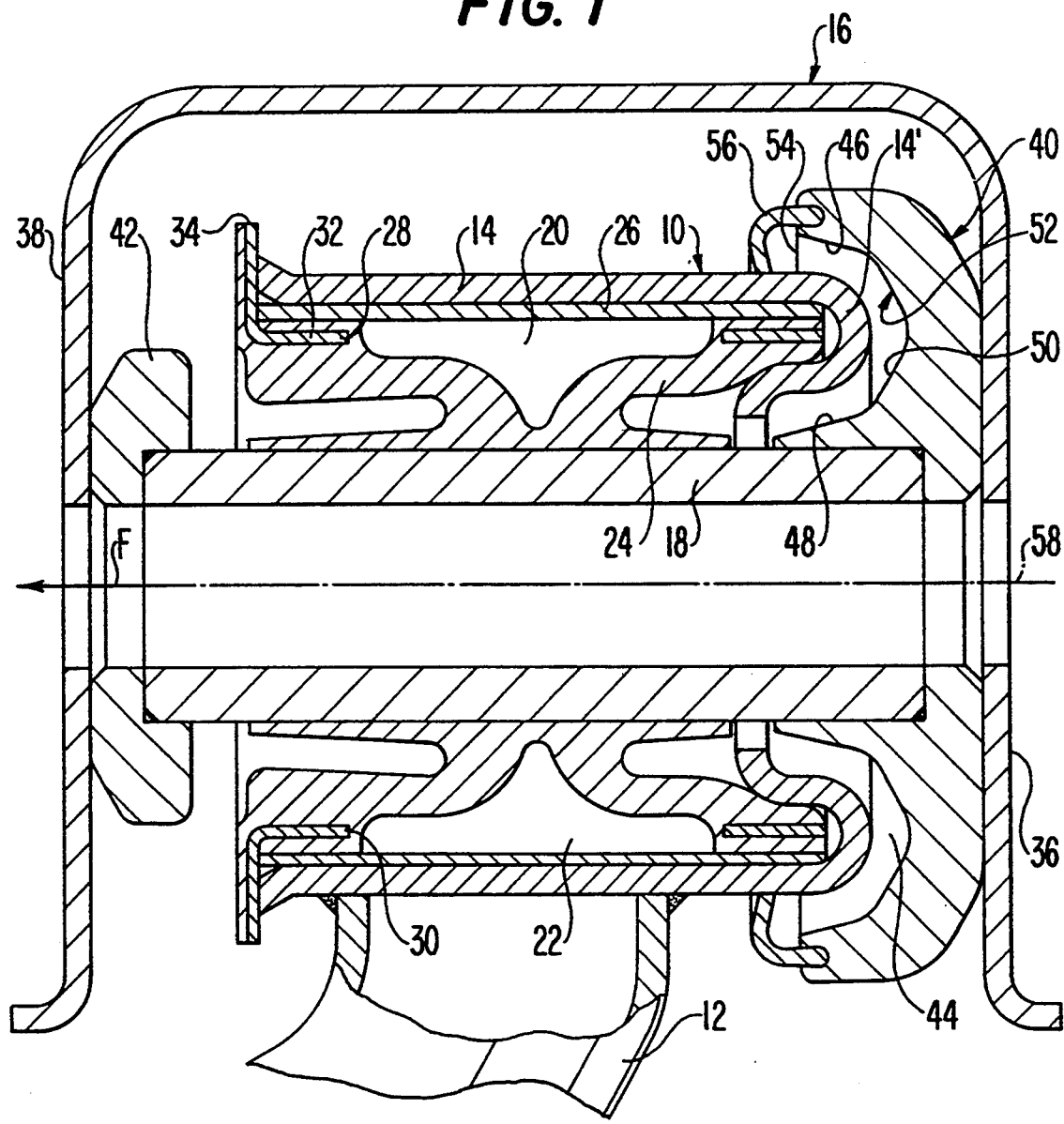
FIG. 1 is a longitudinal cross-sectional view of a first embodiment of a transverse arm support arrangement in accordance with the present invention mounted on a support frame fastened to the superstructure of a motor vehicle.

The support arrangement 10 of FIG. 1 is used to support a radius arm 12, for example a transverse arm, semi-trailing arm or trailing arm of an independent wheel suspension, on the superstructure. The support arrangement can be of any known type and can, for example, be configured as a torsional support arrangement or a sliding support arrangement. In the embodiment of FIG. 1, it is deemed advantageous to make it a hydraulic support arrangement.

The arrangement includes an outer cylindrical support arrangement part 14 fastened to the radius arm 12, an inner support arrangement part 18 located on a hinge pin (not shown for clarity) which is accommodated in a support frame 16 fixed to the superstructure, and a rubber body 24 with, for example, two mutually opposite chambers 20, 22 connected by at least one damping passage (not shown) and containing damping fluid. The rubber body 24 is vulcanized between the sleeve-shaped, inner support arrangement part 18 and a sheet-metal cover 26 pressed into the outer support arrangement part 14.

A metal sleeve 32 penetrated by window-type openings 28, 30 is also vulcanized in known manner into the rubber body 24 in the region of its two chambers 20, 22. At one of the ends of the support arrangement, the metal sleeve 32 has a flange 34 which protrudes radially beyond the end of the support arrangement and is supported on the end of the outer support arrangement part 14 to form an assembly stop.

The inner, sleeve-shaped support arrangement part 18 is fixed in the axial direction between the arms 36, 38 of the U-shaped support frame 16 by a hinge pin formed in conventional manner by a clamping bolt (not shown for clarity) whereas the outer support arrangement part 14, together with the radius arm 12, is flexibly held axially and radially relative to the inner support arrangement part 18 via the rubber body 24.

The outer support arrangement part 14 is associated with a stationary stop 40 formed by a shaped disc placed on one end of the inner, cylindrical support arrangement part 18 and is axially fixed between the latter and, for example, the arm 36 of the support frame 16. This arrangement provides a substantially larger support base compared with the comparable end of the inner support arrangement part 18. In order to create a correspondingly large support base at the other end of the inner support arrangement part 18, a support disc 42 is preferably also applied to this other end of the inner support arrangement part 18, where it is clamped between the support arrangement part 18 and the arm 38 of the support frame 16.

On its end facing towards the support arrangement 10, the shaped disc forming the stop 40 has, formed concentrically within it, an annular groove 44 whose groove walls 46, 48 form, together with the groove bottom 50, a centering surface 52.

The annular groove 44 permits the stop 40 to fit over the end 14', facing towards the stop 40, and, in the initial or design position of the two support arrangement parts 14, 18 (FIG. 1), the surface parts formed by the outer and inner groove walls 46, 48 of the centering surface 52, on the one hand, and the end 14' of the outer support arrangement part 14, on the other hand, are spaced apart laterally and radially.

The annular groove 44 narrows conically towards the inside and its groove bottom 50 forms a bed for centering the end 14' of the outer support arrangement part 14. The end 14' which has to be centered preferably forms an annular bead curved convexly in the direction of the shaped disc.

It is assumed that the support arrangement 10 is used for hinging to the superstructure the radius arm 12 forming a transverse arm and that the superstructure-end geometrical center line 58 of the support arrangement extends in the longitudinal direction of the vehicle.

Figure 2:
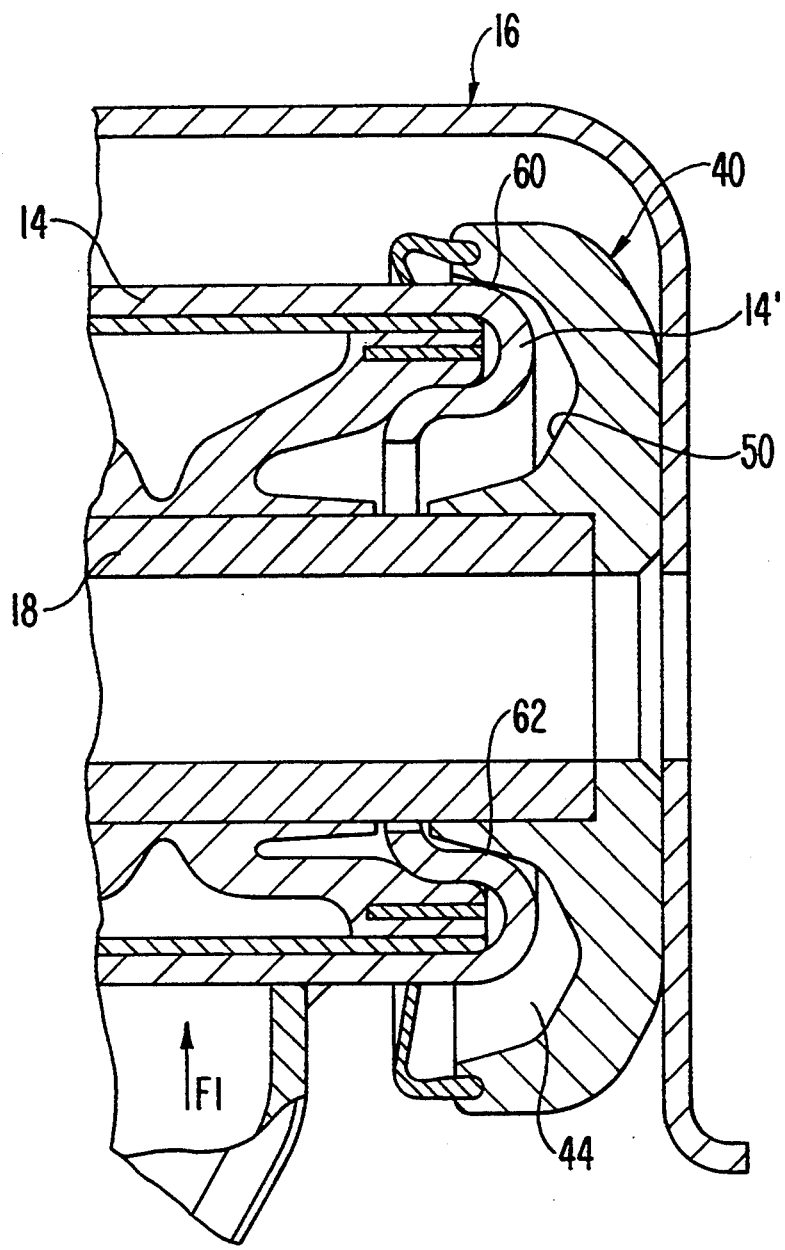
FIGS. 2 and 3 are partial views illustrating the mode of operation of the support arrangement of FIG. 1.

If the arrangement involves, for example, a lower transverse arm, the outer support arrangement part 14 of the radius arm support arrangement 10 at the superstructure end is displaced radially in the direction of the arrow F1 (FIG. 2) during vehicle braking procedures because of a moment caused by the braking force at the hinge point of the transverse arm 12 at the wheel support end. This support arrangement part 14 simultaneously experiences a displacement in the axial direction of the support arrangement against the direction of travel shown by arrow F.

Figure 3:
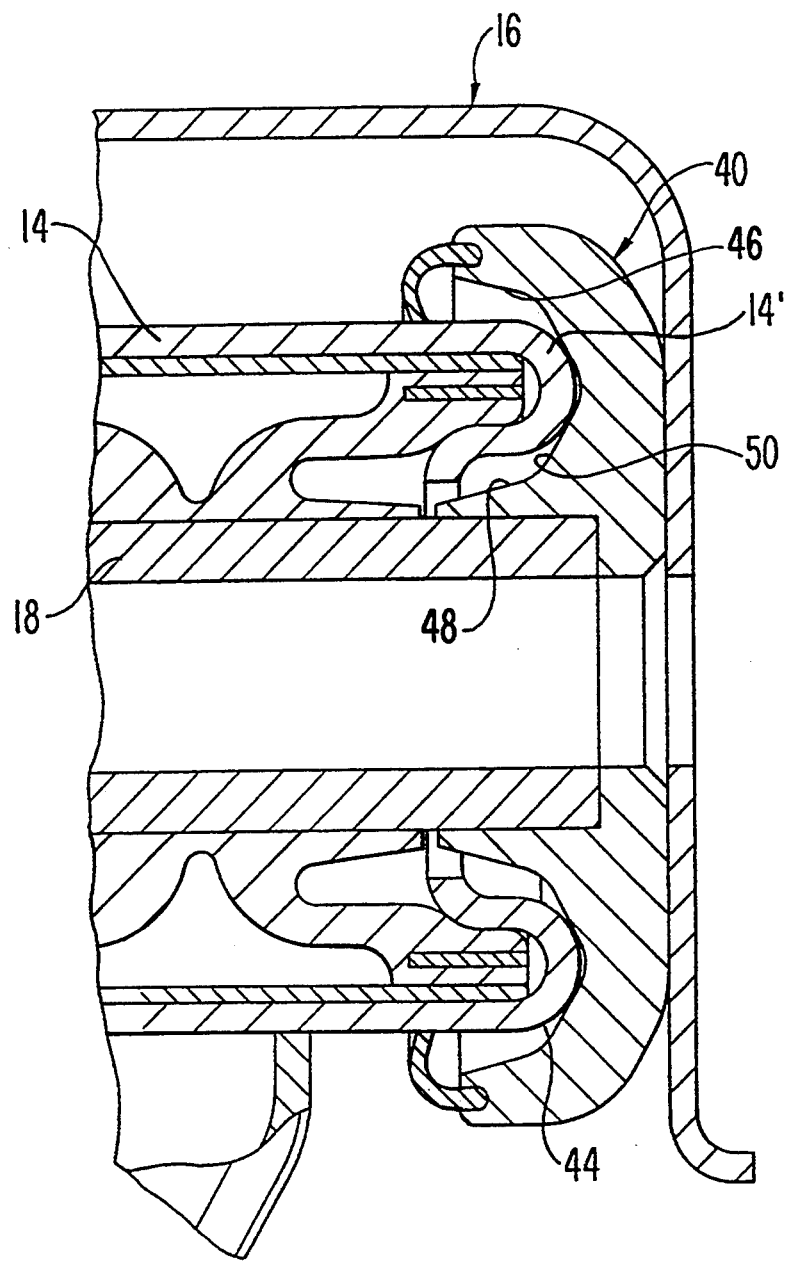

The contour shown in the support arrangement longitudinal section of the disc-shaped stop 40 ensures that these displacements can only take place to a defined extent. The radial motion of the transverse arm 12 is initially limited at the support points 60, 62. A motion of the outer support arrangement part 14 caused by the centering surface 52 can take place simultaneously, depending on the longitudinal force, so that the bead-shaped end 14' of the support arrangement can be guided into the centering bed formed by the groove bottom 50 until it is again centered, relative to the inner support arrangement part 18, on the groove bottom 50 (FIG. 3). The outer support arrangement part 14 is therefore forced into its original center line position by the effects of braking forces. The support arrangement 10 has, in consequence, a self-correcting action.

In order to minimize the friction between the end 14' of the support arrangement part and the corresponding wall parts of the annular groove 44 during braking and movements of the suspension system and to prevent the entry of impurities, an annular, flexible sealing element 56 is inserted into the end wall part 54 of the stop 40 formed by a shaped disc, the part 54 forming the radially outer limit of the annular groove 44. This flexible sealing element 56 surrounds the end 14', configured as an annular bead, at its periphery so as to provide a seal. It is therefore possible to fill the space between the end 14' of the support arrangement part and the annular groove 44 with a lubricant.

As a modification to the embodiment of FIG. 1, the stop 40 can also be provided on the outer support arrangement part 14 and the end of the support arrangement part interacting with its centering surface 52 can be provided on the inner support arrangement part 18.

Furthermore, in the case of triangular or semi-trailing arms, it is possible for only one or both of their radius arm support arrangements to have the configuration according to the invention at the superstructure end. Finally, in the case of double transverse arm wheel suspensions, the support arrangement configuration according to the present invention can be provided on the lower or the upper transverse or semi-trailing arm or on both transverse or semi-trailing arms.

Figure 4:
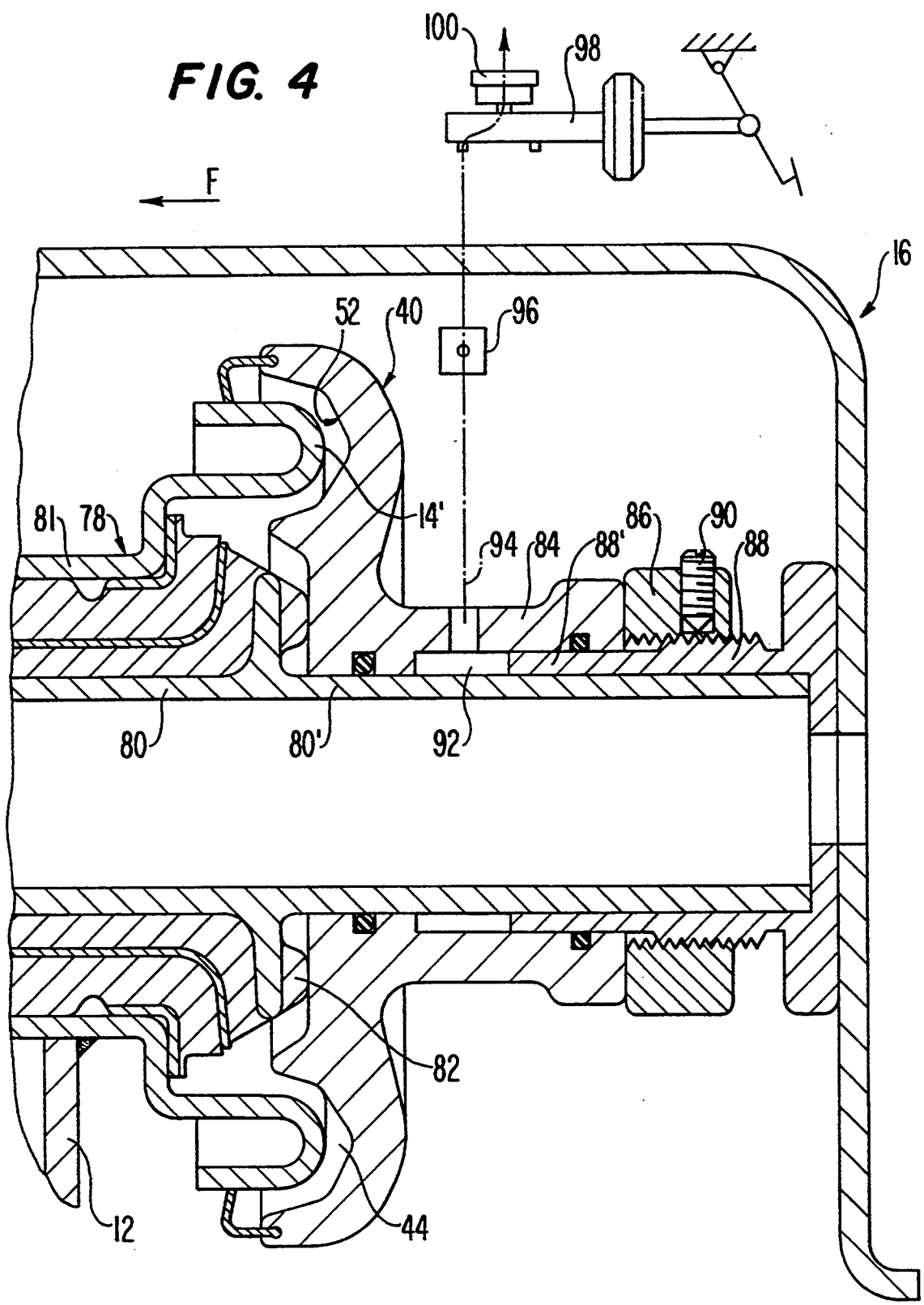
FIGS. 4 and 5 are partial longitudinal sections of other embodiments of support arrangements in their design position.

In the support arrangement embodiment shown in FIG. 4, the stop 40 is arranged so as to be axially displaceable on a hollow cylindrical end piece 80' of the inner bush-type support arrangement part 80 protruding from the torsional support arrangement 78 fixed axially in the support frame 16. The stop 40 is supported, at one end, on an elastic support ring 82 at the support arrangement end and, at the other end by an end collar 84 on an adjusting nut 86 which is rotatable on a threaded bush 88 axially fixed on the end piece 80' of the inner support arrangement part 80. The adjusting nut 86 is arranged so that it can be fixed by a fixing screw 90 which protrudes into the collar 84.

The adjusting nut 86 permits the vehicle stability to be improved in an optimum manner during braking procedures by way of a variable path limitation of the outer support arrangement part 81. In addition, this adjustment possibility permits the radial support arrangement stiffness to be increased by reducing the axial path of the outer support arrangement part 78.

A further improvement to the radius arm support arrangement equipped with an axially adjustable stop 40 can be seen in FIG. 4. This consists in arranging the axial and radial motion limitations of the outer support arrangement part 81 as a function of brake pressure.

For this purpose, an inner section of the stop collar 84 forms, together with the end piece 88' of the threaded bush 88 (which end piece 88' protrudes into the stop collar 84 so as to form a seal), a pressure space 92 which is filled with brake fluid and is connected to a main brake cylinder 98 via a connecting conduit 94 with a pressure reducing valve 96 fitted between.

A certain fluid pressure can, for example, be branched off from the braking system of the motor vehicle via the pressure reducing valve 96 and after the conclusion of the braking procedure, this pressure can be reduced again by a reservoir 100 of the brake circuit.

During a braking procedure, some of the brake fluid is forced via the pressure reducing valve 96 between the stop 40 and the bush end piece 88', the stop 40 being displaced axially in the direction of travel F and the radius arm 12 carrying the support arrangement 78 being displaced axially against the direction of travel F.

Because that the brake hydraulic system will reacts substantially more rapidly than the radius arm 12 overcomes the support arrangement stiffnesses, the displacement time is shortened and the stop 40 is correspondingly displaced axially in the direction towards the support arrangement. As a result, the radius arm displacement is correspondingly and prematurely shortened axially and radially and the desired stabilization of the vehicle is correspondingly further improved.

Brake fluid from both the front axle circuit and the rear axle circuit can be diverted for the generation of pressure in the annular pressure space 92.

In the design position of the radius arm support arrangement 78, the support ring 82 forming a soft rubber buffer provides compensation for tolerances between the stop 40 and the inner support arrangement part 80 and this simultaneously prevents impact noises during axial displacement of the stop 40.

Figure 5:
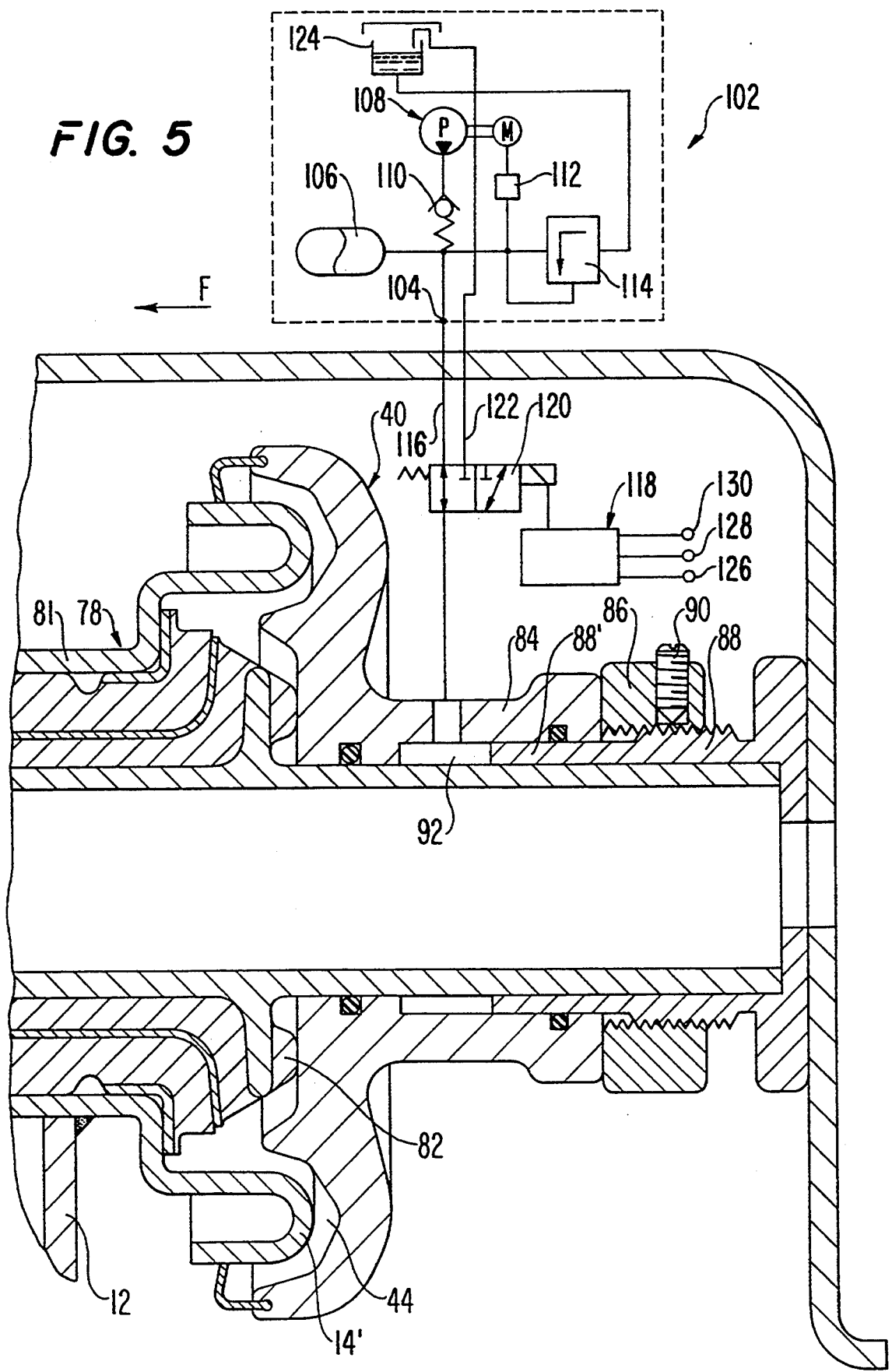

FIG. 5 shows a way of hydraulically controlling the stop arrangement (explained using the embodiment of FIG. 4) as a function of one or more vehicle operating parameters in addition, if need be, to its being controlled as a function of brake pressure. The stop 40 can be controlled by an auxiliary pressure source indicated overall by 102. For example, the pressure source 102 includes a pressure reservoir 106 which is connected to the pressure outlet 104, charged to a minimum pressure level and configured as a hydro-pneumatic spring. The pressure reservoir 106 can be charged by a reservoir charging pump 108 via a non-return valve 110, controlled by a pressure monitor 112. The maximum output pressure of the pressure reservoir 106 and of the auxiliary pressure source 102 is limited by a pressure limiting valve 114.

A supply conduit 116 which can be connected to the pressure space 92 is the outlet 104 and a control valve 120 (3/2-way valve), which can be triggered by a control device 118, is connected into this supply conduit 116. A return conduit 122 leads from this control valve 120 to an unpressurized reservoir 124 of the auxiliary pressure source 102.

The control device 118 can, for example, process a plurality of control and vehicle operating parameters to provide control signals for triggering the control valve 120. These parameters are determined by sensors installed in the vehicle. As examples, a sensor 126 can determine the braking deceleration, a sensor 128 can determine the vehicle speed and a sensor 130 can determine the steering rate or steering angle.

Individual control parameters can be processed in the control device 118 or a plurality of control parameters appearing in the control device 118 can be processed simultaneously by association of control signals.

The stop 40 is therefore, for example, automatically displaced appropriately in the direction of travel F when the vehicle is travelling around a curve so that in the case of transverse or semi-trailing arms, complete compensation is provided, if necessary, for the radial displacement of the outer support arrangement part 81 taking place as a function of the side force and the vehicle can be stabilized because with the control valve 120 driven into the through position shown, the radius arm radial path is immediately shortened appropriately by the stop 40.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A support arrangement for radius arms, comprising an outer support arrangement part, an inner support arrangement part, an elastomer body operatively located between the outer and inner support arrangement parts to provide axial and radial flexibility therebetween, and a stop located at one end of the inner support arrangement part to limit relative motions of the outer and inner support arrangement parts in one direction of a support arrangement center line, which stop has a centering surface concentric with the center line of the inner support arrangement part and facing towards the outer support arrangement part arranged to be brought into contact therewith, which centering surface, in a predetermined position of the support arrangement parts, is at a distance from the end of the outer support arrangement part, wherein the centering surface of the stop has an annular groove narrowing conically inwardly and accommodating an end of the outer support arrangement part to be centered, which end is convexly curved in the form of an annular bead as viewed in an axial direction along the support arrangement center line and a groove bottom of the annular groove forms a centering bed.

2. The support arrangement according to claim 1, wherein the outer support arrangement part constitutes a radius arm lug serving as an exterior bearing part so as to isolate the elastomer body from the centering surface of the stop.

3. The support arrangement according to claim 1, wherein the stop operatively carries, on an end thereof having the centering surface, an annular, flexible sealing element surrounding the end of the outer support arrangement part to be centered.

4. The support arrangement according to claim 3, wherein the distance between the centering surface and the end of the outer support arrangement part to be centered is adjustable.

5. A support arrangement for radius arms, comprising an outer support arrangement part, an inner support arrangement part, an elastomer body located between the outer and inner support arrangement parts and having a stop located at one end of one of the support arrangement parts to limit relative motions of the outer and inner support arrangement parts in one direction of a support arrangement center line, which stop has a centering surface concentric with the center line of the support arrangement part carrying the stop and facing towards the support arrangement part arranged to be brought into contact therewith, which centering surface, in a predetermined position of the support arrangement parts, is at a distance from the end of the adjacent support arrangement part wherein the center surface of the stop has an annular groove narrowing conically inwardly and accommodating an end of the support arrangement part to be centered which end is convexly curved in the form of an annular bead as viewed in an axial direction along the support arrangement center line, and a groove bottom of the annular groove forms a centering bed, wherein the distance between the centering surface and the end of the support arrangement part to be centered is adjustable, wherein the stop is clamped between a shoulder of the inner support arrangement part and an adjusting nut arranged on the inner support arrangement part so that the stop is fixedly adjustable.

6. The support arrangement according to claim 5, wherein the stop is elastically supported on the shoulder of the inner support arrangement part.

7. The support arrangement according to claim 5, wherein the stop is arranged to be adjusted independently of the adjusting nut in a direction towards the outer support arrangement.

8. The support arrangement according to claim 7, wherein the stop is arranged to be hydraulically controlled via a vehicle brake circuit.

9. The support arrangement according to claim 7, wherein the stop is arranged to be hydraulically controlled as a function of a vehicle operating parameter, including side force.

* * * * *